United States Patent
Siripurapu

(10) Patent No.: US 11,716,644 B2
(45) Date of Patent: Aug. 1, 2023

(54) MULTI-PATH USER DATAGRAM PROTOCOL

(71) Applicant: ACUMERA, INC., Austin, TX (US)

(72) Inventor: Ramesh Siripurapu, Fremont, CA (US)

(73) Assignee: ACUMERA, INC., Austin, TX (US)

( * ) Notice: Subject to any disclaimer, the term of this patent is extended or adjusted under 35 U.S.C. 154(b) by 325 days.

(21) Appl. No.: 17/053,783

(22) PCT Filed: May 8, 2019

(86) PCT No.: PCT/US2019/031358
§ 371 (c)(1),
(2) Date: Nov. 8, 2020

(87) PCT Pub. No.: WO2019/217578
PCT Pub. Date: Nov. 14, 2019

(65) Prior Publication Data
US 2021/0266768 A1     Aug. 26, 2021

Related U.S. Application Data

(60) Provisional application No. 62/669,340, filed on May 9, 2018.

(51) Int. Cl.
*H04L 12/26* (2006.01)
*H04L 12/803* (2013.01)
(Continued)

(52) U.S. Cl.
CPC ......... *H04W 24/10* (2013.01); *H04L 43/0829* (2013.01); *H04L 43/0852* (2013.01); *H04L 43/0894* (2013.01); *H04L 45/24* (2013.01); *H04L 45/70* (2013.01); *H04L 47/122* (2013.01); *H04L 69/16* (2013.01); *H04L 69/18* (2013.01)

(58) Field of Classification Search
CPC ....... H04L 43/00; H04L 43/02; H04L 43/026; H04L 43/06; H04L 43/062; H04L 43/08; H04L 43/0876–0894; H04L 43/10; H04L 45/00; H04L 45/16; H04L 45/24; H04L 45/70; H04L 47/00; H04L 47/10;
(Continued)

(56) References Cited

U.S. PATENT DOCUMENTS

| | | | |
|---|---|---|---|
| 9,871,720 B1 * | 1/2018 | Tillotson | H04L 45/306 |
| 2010/0287274 A1 * | 11/2010 | Martinez | H04L 65/70 |
| | | | 709/224 |

(Continued)

FOREIGN PATENT DOCUMENTS

| | | | | |
|---|---|---|---|---|
| CA | 2679951 A1 * | 9/2008 | ......... | H04L 1/1825 |
| WO | 2016058279 A1 | 4/2016 | | |

OTHER PUBLICATIONS

EPO Office Action dated Dec. 16, 2020 received in corresponding EP Application 19 72 8179.3.
(Continued)

*Primary Examiner* — Boris D Grijalva Lobos
(74) *Attorney, Agent, or Firm* — Kowert, Hood, Munyon, Rankin & Goetzel, P.C.

(57) ABSTRACT

The field of the disclosure is the transfer of digital data, particularly multimedia data, from a source to a user of that data using multiple data carrying paths/links/channels.

12 Claims, 11 Drawing Sheets

(51) Int. Cl.
    *H04L 12/709*     (2013.01)
    *H04L 29/06*     (2006.01)
    *H04W 24/10*     (2009.01)
    *H04L 43/0829*     (2022.01)
    *H04L 43/0852*     (2022.01)
    *H04L 43/0894*     (2022.01)
    *H04L 69/16*     (2022.01)
    *H04L 69/18*     (2022.01)
    *H04L 47/122*     (2022.01)
    *H04L 45/24*     (2022.01)
    *H04L 45/00*     (2022.01)

(58) Field of Classification Search
    CPC ....... H04L 47/12; H04L 47/122; H04L 65/00; H04L 65/60; H04L 65/70
    See application file for complete search history.

(56) References Cited

U.S. PATENT DOCUMENTS

| | | | | |
|---|---|---|---|---|
| 2017/0142535 | A1* | 5/2017 | Aggarwal | H04L 65/613 |
| 2018/0324642 | A1* | 11/2018 | Yu | H04L 5/0053 |
| 2019/0379597 | A1* | 12/2019 | Kolding | H04W 28/065 |
| 2020/0120015 | A1* | 4/2020 | Boucadair | H04N 21/64707 |

OTHER PUBLICATIONS

International Preliminary Report of Patentability dated Nov. 19, 2020 and received in PCT/US2019/031358.
International Search Report and Written Opinion dated Aug. 5, 2019 and received in PCT/US2019/031358.

* cited by examiner

MULTI-PATH USER DATAGRAM PROTOCOL

CROSS-REFERENCE TO RELATED APPLICATION

This application is a § 371 National Stage Application of WO PCT/US19/31358 filed on May 8, 2019, which claims priority from U.S. Patent Application No. 62/669,340, filed on Mar. 9, 2018 in the USPTO, the disclosures of which are incorporated herein in its entirety by reference.

FIELD OF DISCLOSURE

The field of the disclosure is the transfer of digital data, particularly multimedia data, from a source to a user of that data using multiple data carrying paths/links/channels.

DISCUSSION OF THE RELATED ART

In the following discussion, certain articles and methods will be described for background and introductory purposes. Nothing contained herein is to be construed as an "admission" of prior art. Applicant expressly reserves the right to demonstrate, where appropriate, that the articles and methods referenced herein do not constitute prior art under the applicable statutory provisions.

Multipath Transmission Control Protocol (MPTCP) is an existing Internet Engineering Task Force (IETF) specification (RFC 6824). It rides on top of standard Transmission Control Protocol (TCP) using Internet Protocol (IP). It creates multiple TCP sub-connections via each of the available Wide Area Network (WAN) links of an IP network. MPTCP adds special options and sequence numbering through those multiple sub-connections and aggregates all sub-connections and makes them look like a single connection to the software application on each end of the exchange of the packets used to convey a payload of data. A data packet is a set of digital data, also referred to as a datagram, a segment, a block, a cell or even a frame depending on the protocol used to transmit the data.

Practical experience indicates that TCP does not work well for multimedia (audio/video) types of digital data even when an application is dedicated to serving and reconstructing multimedia. By way of example, when a data packet is lost, TCP can stall the processing of other data packets until the lost packet is retransmitted. Consequently, loss of just one packet introduces a lag/pause in the audio/video of a multimedia data stream being provided by an application. It may not be that the lag/pause is human perceptible, but multiple of such lags/pauses in close succession due to poor TCP pathways can become perceptible.

These intermittent losses are expected to occur and those intermittent data packet losses exacerbate the lag/pause effects. The resultant intermittent lag/pause is expected because TCP which works with an Internet Protocol (IP), is designed to ensure that data transfer is reliable hence the effort to successfully receive every data packet by retransmitting lost or corrupted packets. To achieve reliability, the transmission control protocol has inbuilt checks to determine whether each and every packet sent arrives at the intended IP address as well as organising those sequentially sent data packets are presented in the sending order. Checks to determine whether packets are missing or have been duplicated, or whether there is any delay in packet transmission and consequent reception. TCP controls some of these checks by setting a timeout period and exchanges signals called acknowledgment (ACKs) and not acknowledged (NACKs) to confirm with the device executing TCP at the sending IP address, that data packets have arrived at their intended destination and are available to be ordered. However, if a packet goes missing, is corrupted, or even if an acknowledgement is not received by the sending end within a predetermined timeout period, there can even be a duplication of sent and received data packets. Thus despite the ever increasing speed of packet and acknowledgement exchange, lags and consequent pauses in the delivery of packets still arise, which may not be critical if a digital document is being sent and received but can be deleterious to the watching and/or listening experience if the data packets contain a multimedia data payload.

There are no general-purpose platform level Multi-path UDP (MPUDP) implementations.

An example of an application specific UDP based multipath implementation is Multipath Real-time Transport Protocol (MPRTP). This particular implementation is meant to improve Voice over Internet Protocol (VoIP) call performance across multiple paths and works tightly integrated with Real-time Transport Protocol (RTP) used specifically for delivering audio and video over IP networks but does not work with other transport protocols. RTP does not in itself guarantee real-time delivery of multimedia data (since this is dependent on network characteristics); it does, however, provide the wherewithal to manage the data as it arrives to best effect. RTP is also used to multicast, which is broadcast mode for a single sender to multiple receivers on a network. As a rule, RTP runs on top of the User Datagram Protocol (UDP), although it can use other transport protocols. Both the Session Initiation Protocol (SIP) and H.323 use RTP.

Another example of an application specific UDP based multipath implementation is a Multipath Tunnel UDP implementation in a very specific user space. Like Multipath TCP which is typically good for making a network connection robust but only works using TCP, a Multipath Tunnel UDP implementation establishes at least one connection from a local server A to remote server B using a multipath tunnel between those servers. The connection between Server A running one or both a Multipath client (MP client) application and a Multipath server (MP server) application, and Server B running one or both a client application and a server application. The complementary applications have information about two or more bridge servers thus providing the multipath aspect of the arrangement. Bridge servers are only used to forward packets from an associated MP server application to a MP client application. MP Client application is configured with one or more bridge servers' information (name or IP and port numbers). MP Client application listens on port 3000. OpenVPN Client is run along with MP Client and connects to MP Client at that port. MP Client then forwards packets from OpenVPN Client to configured Bridge Servers. Similarly, MP Server application is run along with OpenVPN Server. They connect to each other at predetermined ports. MP Server application forwards packets received from Bridge Servers to OpenVPN Server and vice versa. Each bridge server uses a Socket CAT (Linux command socat) to act as TCP/UDP port forwarder without using the firewall. Socat is a command line-based utility that establishes two bidirectional byte streams and transfers data between them. Because the streams can be constructed from a large set of different types of data sinks and sources (see address types), and because lots of address options may be applied to the streams, socat can be used for many different purposes and can forward UDP sockets. The bridge server will listen on UDP port 3001 and forward any received packet to 1.1.1.1 MP Server 2000, and vice versa. Then the OpenVPN client connects to localhost:3000 which where the MP client application is listening on, then OpenVPN will establish an OpenVPN connection over a Multipath UDP tunnel via one or more dedicated associated bridge servers. However, the MP client and MP server need to begin at the same time to establish a tunnel, there can only be a single target host, and this use of OpenVPN automatically encrypts so this adds to the data packet numbers and size. The configuration and use of this Multipath Tunnel UDP implementation is not suitable for data packets with multimedia data payloads. This implementation is not measuring path characteristics or dynamically adjusting packets sent on each path.

Another Multipath implementation is Multilink Virtual Private Network (MLVPN) similar to OpenVPN, which can create a network tunnel between two computers. MLVPN encapsulates network packets, using UDP and sends them encrypted over the Internet to a particular IP addressed location. The primary use of MLVPN is to create bonded network links in order to benefit from the data packet bandwidth of multiple links. Again, encryption is added to every packet which affects throughput, but this implementation can include use of cellular and ADSL links. This implementation has one MLVPN Client and one MLVPN Server on remote ends. Each end is configured with multiple paths (IP Addresses and port numbers). It establishes UDP streams across multiple paths, i.e. sends some packets over one path, some on other path, all over UDP only. Encryption is optionally configurable. This arrangement includes the measurement to path loss on each path and takes a path out of use if path loss exceeds a pre-configured limit. This arrangement does not measure path latency, data packet bandwidth etc. and neither does the arrangement dynamically adjust the amount of traffic flow on each path based on path data packet bandwidth. Either a path is in or out.

In the following example of a prior art arrangement there is a single client application that uses multiple paths, as depicted in FIG. 1 (prior art). There is only one Client at a given location. The client uses multiple paths to communicate with the Server. In the description, which follows, 'sender and'transmitter are generic terms for the same function. Each end of a path has a transmitter of packets in one direction and also a receiver for data packets sent from the other direction the exchange of data packets sometimes referred to as traffic.

In this example of a prior art arrangement, the transmitter transmits data packets on all paths P1, P2 and P3 to the receiver, which merges the received data packets. Paths P1, P2, and P3 are shown as respectively Wi-Fi, Cellular 1 and Wired data packet paths. Each direction of traffic is independent of the other. Packets transmitted on each path have their own monotonically increasing sequence number. The receiver keeps track of packet reception on each path. It uses a re-ordering buffer to re-order and merge received packets from all paths before presenting the packets to the application. At periodic measuring intervals (INTVL), the receiver computes the loss of packets that occurred on each path during that interval and transmits a report message (RR) to the sender. Each RR also contains the highest sequence number received on each path up until the RR transmission back to the sender. The RRs enable the sender to calculate path characteristics such as Link Capacity (BW), Loss Percentage (LP), Latency (LAT) and Jitter (JIT). The sender keeps copies of transmitted packets until the receiver acknowledges them. After packets are acknowledged, the sender discards the copies of those packets. Thereafter, the sender adjusts its sending rate on each path based on path characteristics calculated during previous the INTVL. Unless the lost packets are resent, they will be lost and never recovered.

Transport protocols, such as RTP, have not been designed to take advantage of the availability of multiple concurrent paths.

Multipath Real Time Protocol (MPRTP) is an OPTIONAL extension to RTP [RFC3550] that allows splitting a single RTP stream into multiple sub-flows that are transmitted over different paths. In effect, this pools the resource capacity of multiple paths. Multipath RTP (MPRTP) is an extension to RTP it is used along with MPRTP to report per-path sender and receiver characteristics.

Other IETF transport protocols that are capable of using multiple paths include SCTP [RFC4960], MPTCP [RFC6182] and SHIM6 [RFC5533]. However, these protocols are not suitable for real-time communications as they continue to use the underlying RTP ACK and NACK approach to data integrity.

Furthermore, re-ordering is important because packets are not sent at the same speed on every path. Packets will be received out of order which confuses a TCP. Without re-ordering enabled, expect the data rates used to be limited to the data packet bandwidth of the slowest link.

The available options still do not readily allow for acceptable/reliable reception of data packets containing multimedia data. There is a need for new methods and apparatus to improve reliability when data packet losses occur and still allow for aggregation when possible.

The discussion above is merely provided for general background information and is not intended to be used as an aid in determining the scope of the claimed subject matter. The claimed subject matter is not limited to implementations that solve any or all disadvantages noted in the background.

SUMMARY OF THE DISCLOSURE

This Summary is provided to introduce a selection of concepts in a simplified form that are further described below in the Detailed Description. This Summary is not intended to identify key or essential features of the claimed subject matter, nor is it intended to be used to limit the scope of the claimed subject matter. Other features, details, utilities, and advantages of the claimed subject matter will be apparent from the following written Detailed Description including those aspects illustrated in the accompanying drawings and defined in the appended claims.

Embodiments of the invention relate to a systems and methods of operation to transfer data packets having a multimedia data payload across multiple pathways.

In an aspect there is a method for using the User Datagram Protocol to manage the sending of data packets over multiple available data packet transmission channels, the method comprising the following steps. The step of allocating a unique identity to each data packet including an order indicator to form an ordered series of data packets. The step of transmitting one or more of the ordered series of data packets on a predetermined one of the available data packet transmission channels at a predetermined rate for transmission using User Datagram Protocol. The step of receiving after a predetermined measuring interval, data representative of one or more data packet transmission channel conditions associated with prior transmissions of one or more of the ordered series of data packets transmitted using User Datagram Protocol. The step of determining using the one or more conditions to make available further of the ordered series of data packets to a predetermined one of the available data packet transmission channels at a predetermined rate for transmission using User Datagram Protocol according to one of a predetermined data packet distribution mode, wherein the available data packet transmission channels receive none, one or more of the ordered series of data packets in accordance with the predetermined mode, being one of aggregation, best path group selection, or duplication, of selected of the ordered series of data packets.

In another aspect there is a method for using the User Datagram Protocol to manage the reception of data packets, each data packet having an order indicator, over multiple available data packet transmission channels, the method comprising the following steps. The step of receiving data packets using User Datagram Protocol from one or more of the available data packet transmission channels. The step of sorting the data received data packets using the order indictor. The step of determining from one or more of the received data packets, one or more data packet transmission channel conditions. The step of transmitting over an available data packet transmission channel, after a predetermined measuring interval, a datagram containing data representative of one or more data packet transmission channel and data representative of the rate of datagram transmission associated with selected of the ordered series of data packets wherein the available data packet transmission channels make available none, one or more of the ordered series of data packets in accordance with a predetermined mode, being one of aggregation, best path group selection, or duplication, of selected of the ordered series of data packets. The step of making available the received data packets as an ordered series of data packets.

DETAILED DESCRIPTION

As used in the specification and claims, the singular form "a", "an" and "the" include plural references unless the context clearly dictates otherwise.

The present invention can "comprise" (open ended) or "consist essentially of" the components of the present invention as well as other methods or elements described herein. As used herein, "comprising" means the elements recited, or their equivalent in structure or function, plus any other element or elements which are not recited. The terms "having" and "including" are also to be construed as open ended unless the context suggests otherwise. As used herein, "consisting essentially of" means that the invention may include ingredients in addition to those recited in the claim, but only if the additional ingredients do not materially alter the basic and novel characteristics of the claimed invention.

Where used herein, the term "and/or" when used in a list of two or more items means that any one of the listed characteristics can be present, or any combination of two or more of the listed characteristics can be present. For example, if a composition is described as containing characteristics A, B, and/or C, the composition can contain A feature alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the terms paths/links/channels are equivalent expressions of multiple data carrying mechanisms of software and hardware configurations well known to those of skill in the art.

Figure 1:
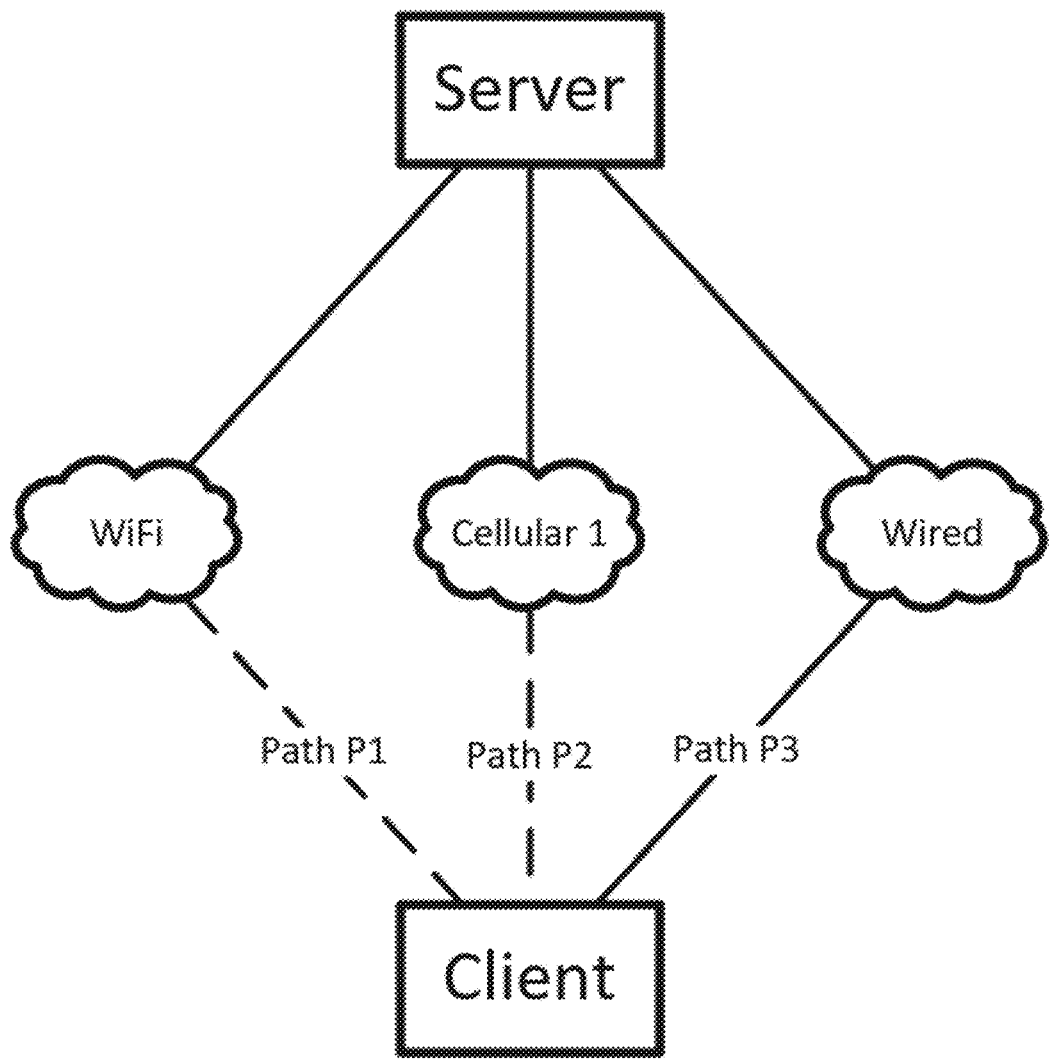
FIG. 1 depicts a single client using multiple paths (prior art)
Figure 2:
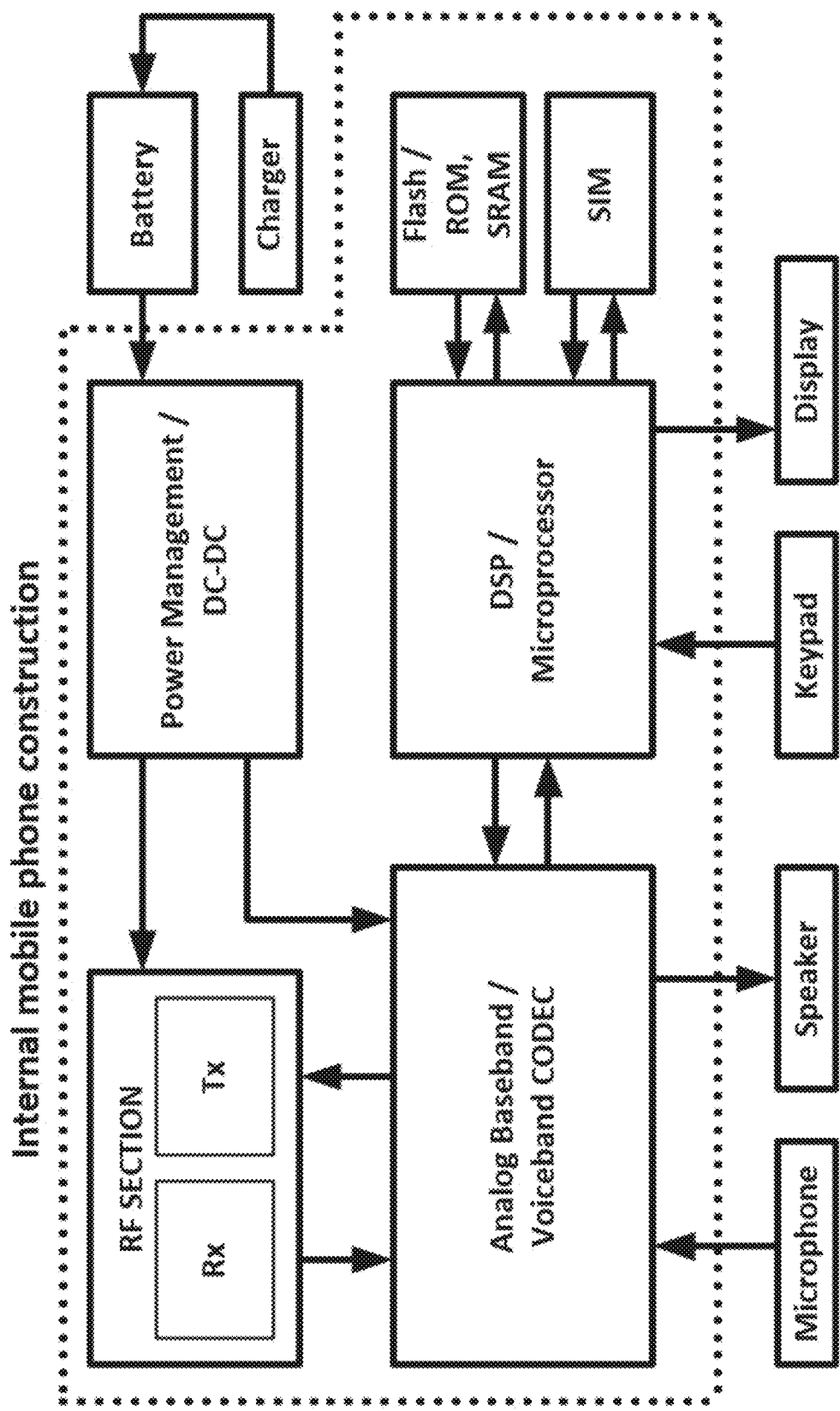
FIG. 2 depicts a hardware configuration of a data receiving device (prior art)

FIG. 2 (prior art) depicts an example configuration of the elements internal of a mobile computer device useable for the purposes described in this specification. The main element is the Flash/Read Only Memory (ROM) and Static Random-Access Memory (SRAM), which are examples of the digital data and data packet storage devices in which one or more applications are stored and retrieved from and used during execution of the application and handling of digital data and digital data packets. These types of memory are typically non-transitory so that they can permanently store the programs and applications used to perform the methods disclosed herein. These applications perform a relevant portion of the methods described herein and the methods are available as a standalone sub-routine or integrated into the application program that is not specific to mobile phones, since the application could be executed on a router device (similar to a router) that has built-in Wi-Fi and cellular links, just as the application of executable code could be available on any computer device, which may not need keyboard, display, microphone, speaker, battery and charger. There can be other types of digital storage memory which is transitory (Random Access Memory) in that digital data is only temporarily stored there to assist the speed of data handling during calculations and sorting. However, common to all of the arrangements is at least one computer processor (digital signal processor or microprocessor) for executing the code/program stored in the respective memory. The embodiment disclosed in FIG. 2 includes an RF section that is used not only for communication of the data packets being sent and received by the respective cellular system used by the mobile device, they are also used for Wi-Fi and Bluetooth communication of data packets as alternative paths for data packets. The remaining elements are well known as is the connection and use of each element in a computer device such as a server, router, network of computers and the like.

Single Client and Multiple Paths

The following are a collection of methods and associated apparatus which address one or more, or reduce one or more, of the problems of the prior art described.

The following embodiments of methods provide for the sender device to select different path algorithms based on the application requirements, namely:

AGGREGATION—maximize data packet bandwidth at the cost of some loss which is tolerable.

BEST PATHS GROUPING—select a group of best paths that meet specified loss and latency criteria.

DUPLICATION—send all traffic on all paths.

Aggregation (AGGR): In this mode, the sender splits the traffic in proportion to the data packet bandwidth (BW) of each path. At every INTVL, the sender computes the sometimes-changing path characteristics of each path and computes the ratio of data packets to be transmitted on which of the available paths during the next INTVL.

An INTVL can be varied during this method and need not be constant. Dynamically changing the INTVL can result from determining the overall reliability of the paths or of the worst path/s: the known quantity of data packets to be sent, and the number of paths available in the future. For example, if the algorithm detects path characteristics are changing rapidly (like in a moving vehicle), it can decrease the INTVL to adapt to changing conditions quickly. If conditions are not changing like in a stationary environment, it can increase INTVL to avoid unnecessary computations. So, INTVL is a function of rate of change of path characteristics Loss Percentage (LP) and Latency (LAT)

BW of path P1 (BW1)=(number of packets sent*(1−Loss Percentage reported by the receiver over path P1))/INTVL seconds, where the BW of path P1 is referred to as BW1.

BW of path P2 (BW1)=(number of packets sent*(1−Loss Percentage reported by the receiver over path P2))/INTVL seconds, where the BW of path P2 is referred to as BW2.

BW of path P3 (BW1)=(number of packets sent*(1−Loss Percentage reported by the receiver over path P3))/INTVL seconds, where the BW of path P3 is referred to as BW3.

Total BW (BW)=BW1+BW2+BW3
(1) Ratio of traffic to be sent on P1=BW1/BW
(2) Ratio of traffic to be sent on P2=BW2/BW
(3) Ratio of traffic to be sent on P3=BW3/BW The ratio directly correlates to the quantity of data packets to be sent over which path within the next INTVL but since an interval may be dynamically changed then the ratio will still apply.

The AGGR method is used to maximize the total aggregate data packet bandwidth transmitted by the total of all available paths. Since traffic split is calculated over every successive INTVL and applies to a future INTVL, sudden packet losses over a path are not addressed by the calculation which will result in the lossy path getting a lesser ratio than during the prior INTVL, but this does not make any difference to the lossy characteristic of that path. So, this method or apparatus does not minimize Lost Packets per path it does however, bias the sending of data packets over the less lossy paths. Each path data packet bandwidth is estimated every INTVL as described previously. The ratio of each path BW as a percentage of total BW is calculated as specified in (1), (2) and (3). And that data packet bandwidth percentage is used to split traffic proportionately across paths. Example: if one path BW is 2 Mbps, another is 8 Mbps, total is 10 Mbps. So, 2 packets are sent first path, 8 packets sent on 2nd path and cycle continues in that manner. This method does not eliminate any path even if it is performing poorly. Each path gets its share of traffic however little it may be. This aspect of the method makes use of all paths and thus delivers the maximum throughput.

Best Paths Grouping (BPG): in this mode, the sender selects the paths that have similar data packet transmission characteristics and aggregates the traffic on those selected paths to the exclusion of paths that have a different enough data packet transmission characteristics indicative of a comparatively poor and/or worse transmission characteristic. The selection ensures that the poor/worse paths are recognised and are not blindly used for the purpose of aggregation. This aspect of the method eliminates certain paths from use based on configured parameters. For example, this aspect of the method in an embodiment, does not use a path if the loss percentage is 2% or higher or this aspect of the method in an embodiment, does not use a path if latency is more than 100 ms. This aspect of the method does not achieve maximum data packet bandwidth. Instead, this aspect of the method in an embodiment makes the path selection more suitable for multimedia applications.

If a poor path is used blindly for aggregation, it reduces downwards overall aggregate data packet bandwidth since the receiver has to wait for the packets transmitted on the poor path/s relative to the better paths.

At every INTVL, in an embodiment the sender adjusts the Transmit (TX) rate since the sender is provided knowledge of the TX rate from the receiver of the packets sent in the previous INTVL based on path characteristics calculated in the previous INTVL. In Best Path Grouping mode, the sender reviews the available data relating to the characteristics of each path to determine which group of paths have. A feedback mechanism from receiver to sender is used referred to as RRs. Using RRs, the sender calculates, including one or more of: LP, LAT, BW etc. of the path characteristics every INTVL. Based the path characteristics calculated, the sender adjusts TX rate as described previously.

In one embodiment, the least Lost Packets (LP) and least latency (LAT) are two of the available characteristics of a path.

In an embodiment the sender performs the following steps to determine the paths to use for aggregation and so avoid the (comparatively) poor paths.

The method described, in an embodiment, provides a best path group selection (by way of preferable steps) of which two or more channels can be used for the sending of data packets over multiple available data packet transmission channels.

A preferable step includes the process of selecting out of all the available channels all those channels with less than predetermined Lost Packet ratio to form a selected first group of channels. Wherein when the predetermined Lost Packet ratio is between 0.01% and 4%, and in a preferred arrangement the predetermined Lost Packet ratio is 2%.

A further preferable step includes determining the channel with the least Latency value (LAT) among the selected first group of channels.

A yet further preferable step includes determining from within the selected first group of channels, a second group of channels, which have a LAT value within a predetermined value, of the LAT value of the path determined to have the least LAT value. Wherein the predetermined LAT value is between 10 milliseconds and 200 milliseconds and in a preferred arrangement the predetermined LAT value is 100 milliseconds.

The final preferable step being to transmit data packets on the second group of paths in the ratio of the data packet bandwidth (BW) of each path in the second group of paths.

The second group of paths can be referred to as the Best Path Grouping (BPG).

By way of example, if P1 and P2 are the Best Path Grouping of paths the total BW of the BPG=BW1+BW2. On P1, send BW1/BW percentage of traffic. On P2, send BW2/BW percentage of traffic. In this example, no data packets are sent on P3.

In an embodiment, the BPG is a constrained version of AGGR. The AGGR method maximizes aggregate data packet bandwidth, but overall LP and LAT may be higher. The BPG method minimizes overall LP and LAT, but aggregate BW may be lower. In an embodiment, based on application requirements, either BPG or AGGR can be configured at system start-up. The preferred method is used as long as the configuration is changed via the user interface and the system is restarted.

In determining the predetermined Lost Packet ratio is between 0.01% and 4% and in a preferred arrangement the predetermined Lost Packet ratio is 2%. The value of 2% is preferred based on testing of VoIP and video conferencing applications. Loss of 2% of packets is not perceivable in audio and video conversations. Anything above that and the user starts to notice the quality of the received VoIP and Video output. There is really no range that is enforced in the system. The value can actually be anywhere from 0% to 100% and is dependent on the application. Testing is conducted with a specific application and is then possible to determine the appropriate value. This value is configurable using the user interface, but in an embodiment, the value cannot be changed dynamically. In the embodiment, the system needs to be restarted after changing this configuration.

In determining the predetermined value variation of a LAT value of a path the considerations include those considerations described previously and in a preferred embodiment the LAT value is 100 ms, which has been determined as acceptable for VoIP and video calls. The range for LAT can be anywhere from 10 ms to 1000 ms or more.

Packet Loss Recovery (PLR): in this mode the receiver detects loss on, say path P1, receiver requests sender to retransmit via path P2 or path P3 whichever has no or less loss than that detected on path P1. Sender will then retransmit lost packets on a better path.

The sender transmits packets 1,4,7,10,13,16,19 on P1, packets 2,5,8,11,14,17 on P2 and packets 3, 6, 9, 12, 15, 18 on P3. Say packet 13 on P1 and packet 14 on P2 are lost. None of the packets on P3 were lost. The receiver detects these losses and determines that path P3 is a more reliable path within the current INTVL. The receiver then sends a Pack Loss Recovery request (PLR-REQ) to the sender, using path P3 (this assumes reciprocity of the path). PLR-REQ contains packet IDs, which need to be retransmitted. In this case, PLR-REQ contains IDs for packets 13 and 14. The sender, upon receiving a PLR-REQ on P3, retransmits packets 13 and 14 on P3.

Figure 5:
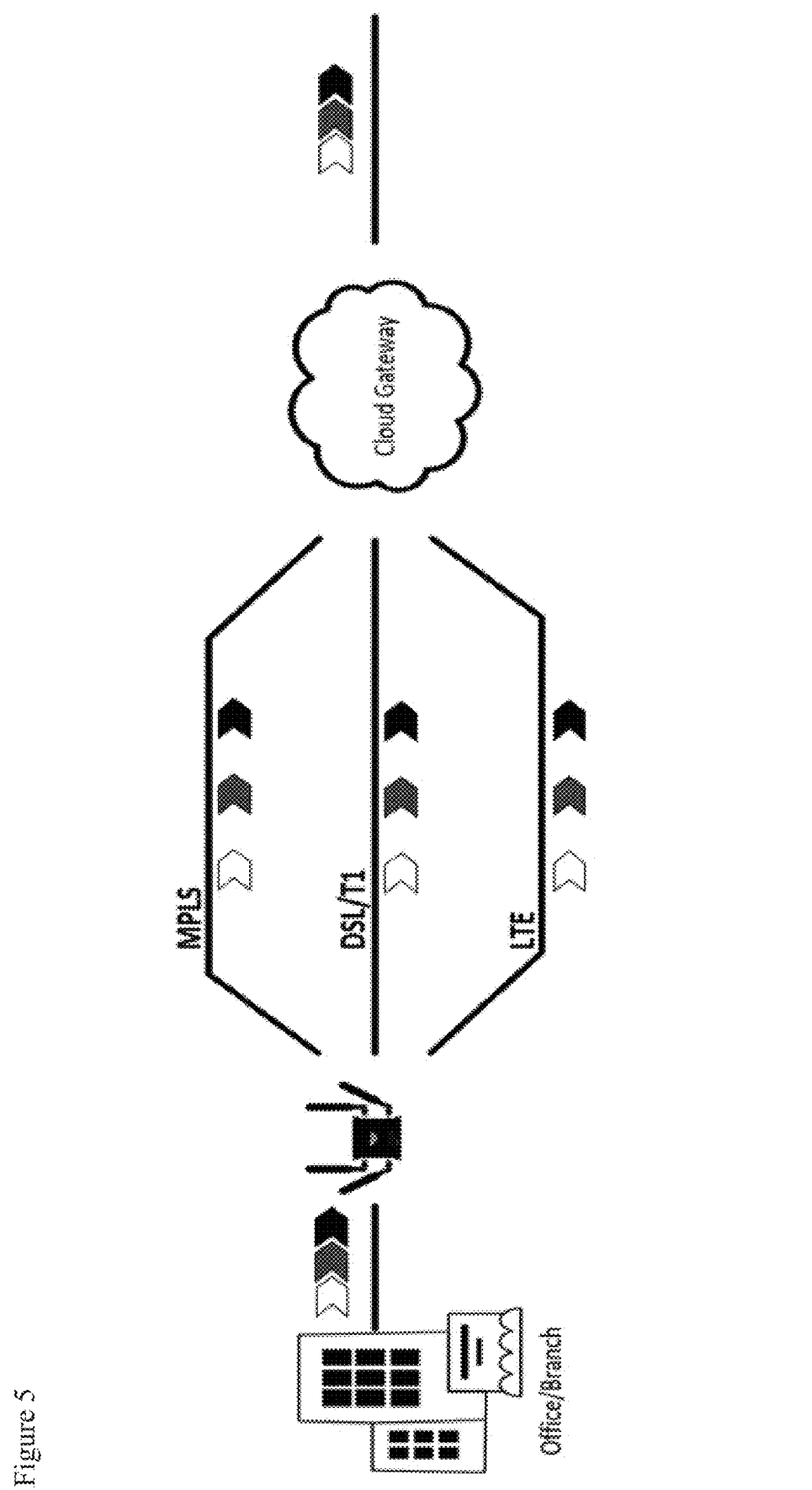
FIG. 5 depicts a flow diagram illustrating duplication of data packets.

Duplication (DUP): When the sender detects non-zero LP on all paths and that the Packet Loss percentage is above a configurable predetermined threshold, say 2%, it switches to duplication mode. In DUP mode, depicted in FIG. 5, the sender device transmits the same packets on all paths. This approach highly improves reliability but not throughput.

In an embodiment the sender performs the following steps to determine when to use duplication so as to avoid the effects of (comparatively) poor paths.

The method provides a duplication of the sending of data packets over multiple available data packet transmission channels.

A step in the method is the detection by the sender of non-zero lost packets on all available channels.

A further step is the determination that the detected packet loss percentage is above a configurable predetermined threshold.

A yet further step is switching the transmission of all data packets on all the available channels when the configurable predetermined threshold is reached.

The method, in an embodiment, includes when the configurable packet loss percentage is within the preferable range 0.01% to 4%, as described previously The method, in an embodiment, includes when the configurable packet loss percentage is preferably 2%.

The sender transmits packets 1,4,7,10,13,16,19 on P1, packets 2, 5, 8,11,14,17 on P2 and packets 3, 6, 9, 12, 15, 18 on P3. Say packet 13 and 16 on P1 and packets 11 and 14 on P2 and packets 12 and 15 on P3 are lost. The receiver detects these losses in the current INTVL and reports them in RRs to the sender. The sender determines that all paths are lossy (which is a relative measure known to those skilled in the art) since LP is above a predetermined configured threshold. The sender then switches to DUP mode for the next INTVL. In DUP mode, the sender will transmit 20, 21, 22, 23, 24, 25, 26, 27 on all paths (P1, P2, P3). Say, packets 21 and 22 are lost on path P1, packets 23 and 24 are lost on path P2 and packets 25 and 26 are lost on path P3. The receiver has still received all packets successfully.

When the packet loss on each path falls below a predetermined configured threshold, the sender switches back to AGGR or BPG modes. This switching of sender between AGGR or BPG and DUP modes, combined with receiver-initiated PLR improves reliability significantly at the same time as achieving improved aggregation when possible.

Multiple Clients and Multiple Paths

Figure 6:
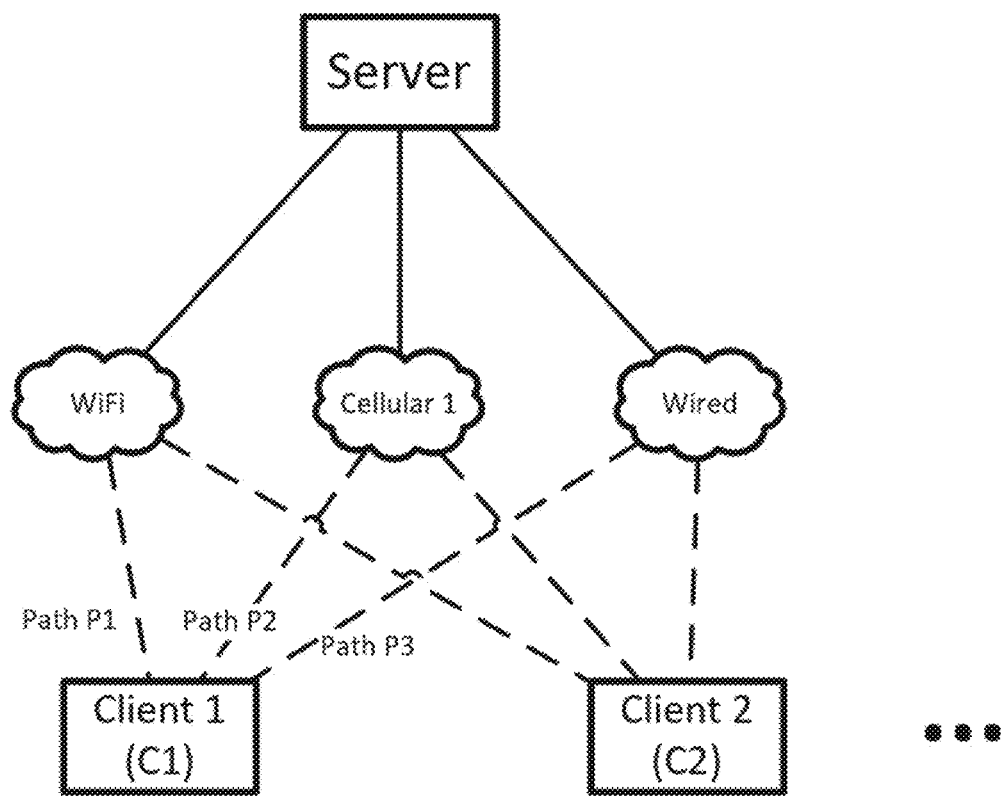
FIG. 6 depicts a packet transmission arrangement including paths P1, P2 and P3 used by multiple clients to the same server.

FIG. 6 depicts an arrangement where multiple clients being proximate such that they can all access the same multiple paths. All of the clients can move around a given site and communicating with the same server (either a single server or cluster of servers). In this arrangement, the client that knows the "position" of each client device can leverage that information to improve reliability. A client "position" can be determined and provided in any suitable format, and in one example, as an X, Y co-ordinate of a geographic reference, and may be mapped so that the position can be better represented to a user but that is not a requirement.

Technologies usable in a device for providing data transmission paths, telephony such as CDMA networks, cellular tower (Cell ID) and Wi-Fi (802.11) access points which rely on the transmission of unique identifiers and related known location data permit use of multiple clients (C1, C2, . . . ) using different receiving devices. The use of hybrid technologies such as these can, by themselves, allow for data packet transmission despite the occasional unreliability of one or more of them in different environmental and physical locations of the receiving device. There are numerous technologies for data packet transfer, and associated with each technique there will be specific details of their accuracy, data packet bandwidth and other packet transmission characteristics. There is however no standard agreed as to how multiple data packets should be best transmitted especially when transmitting multimedia.

There can be many paths available, in an arrangement including a mobile device as the client, being provided by one of many wireless Access facilities (Access points (APs)). Each client can constantly report to the server associated with the application residing on the server and the mobile device using those APs it is able to access. The server can also be pre-configured to use one or more APs, which for example have known data packet exchange characteristics. Based on the locations of preconfigured APs and the AP reporting provided by each client device, the associated server can calculate the "position" of the client at any given instant. The server can thus maintain a co-ordinate-based record including LP, LAT and BW of each wireless path for each known AP. Those coordinates of APs can be made available to each mobile device executing a client application. The client can then make informed determinations of which path via which AP to use when the mobile device is in the vicinity of the respective APs, e.g. if Path P1 is lossy at location L1, clients can avoid using path P1 at L1 and instead use path P2 and/or path P3 which are known to be in the vicinity of the location of the mobile device as depicted in FIG. 6.

Single or Multiple Clients and Multiple Paths

Figure 7:
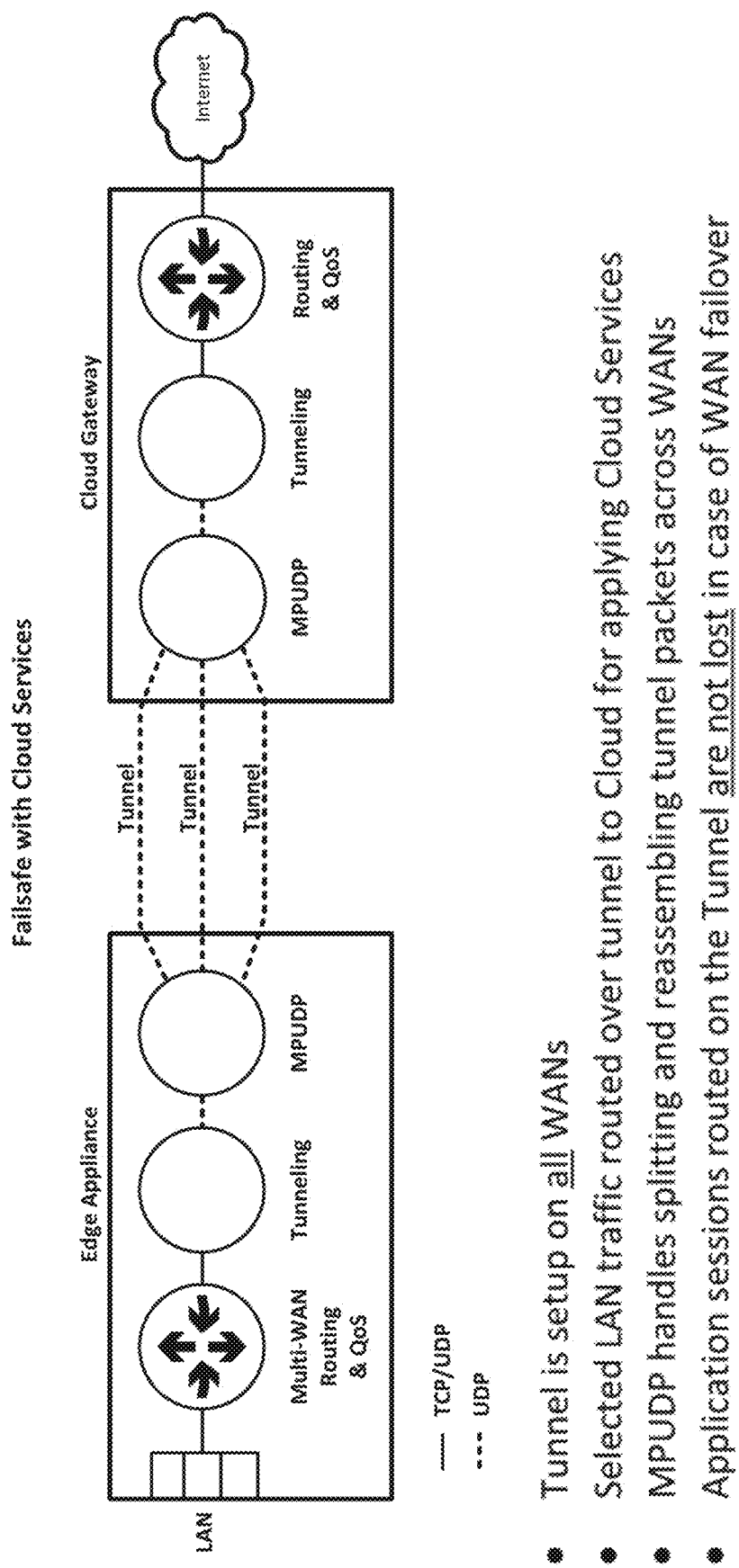
FIG. 7 depicts one embodiment of the use of single tunnel over an MPUDP configuration using Tunneling software as an application.

FIG. 7 depicts one embodiment of the use of single tunnel over an MPUDP configuration using Tunneling software as an application In a preferred embodiment, a method works at UDP level, which is application layer, but the way it is combined with OpenVPN creates a standalone network interface in the system. Further, the network interface can be used by any application (e.g. Skype voice call) to send receive packets without them knowing packets are using an OpenVPN-MPUDP tunnel" OpenVPN is an existing open secure tunneling software application. It typically runs on standard TCP or UDP. It sends packets via TCP/UDP sockets destined to another end, which is its peer OpenVPN. Typically, those TCP/UDP packets go through single path through the Internet to reach the other end. If the path breaks, the tunnel is lost, and it then needs to re-establish. Furthermore, OpenVPN software creates a virtual interface in the system it is running (e.g. tap0 or tun0). It appears as though yet another physical network interface to all applications running in the system. Applications can send packets via that virtual interface. OpenVPN transparently encapsulates them in underlying TCP or UDP protocol, transmits them to other end, which then de-encapsulates and delivers the output to the other side application. What is being done, in an embodiment, is adding another layer (MPUDP) between two OpenVPN ends. As illustrated in FIG. 7, MPUDP takes packets from tunneling software such as OpenVPN, splits them on multiple paths intelligently using algorithms described above and transmits those packets to other end. At the other end MPUDP reassembles and delivers those packets to OpenVPN. OpenVPN software on both ends does not know their packets are being intercepted and transmitted over multiple paths and reassembled. This way, the benefits of OpenVPN are retained due to the transparent tunneling mechanism, yet at the same time, in an embodiment, there has been use of the multipath capabilities of the various embodiments and methods described.

In other embodiments, different methods can be deployed to work with MPUDP in which different tunneling mechanisms like L2TP, GRE or IPSEC technologies can be used on top of MPDUP.

Figure 8:
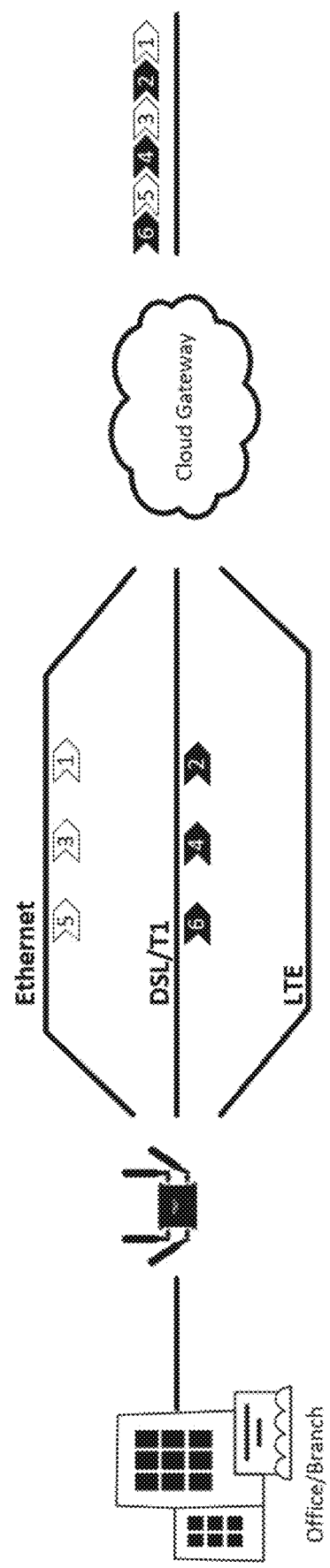
FIG. 8 depicts Failsafe packet transmission arrangement between a wireless router and a cloud-based server.

In yet another embodiment, a non-tunneling application like a media server or client can directly work on top of MPUDP FIG. 8 depicts Failsafe packet transmission arrangement between a wireless router and a cloud-based server which receives packets, sorts them and makes them available to a respective application.

As described previously, the MPUDP splits traffic across multiple paths. It sends some packets on path1 (for example DSL/T1), other packets on path2 (for example LTE) as described in association with the AGGR and BPG embodiments. The receiving end reassembles them into the correct sequence and transmits them. This embodiment is referred to as Failsafe, since all paths are being continuously monitored and if a path fails or even reduces dramatically in performance, it is taken out of use, in some cases the very next interval. An end-to-end OpenVPN tunnel does not get disconnected as long as there is at least one path usable.

Figure 9:
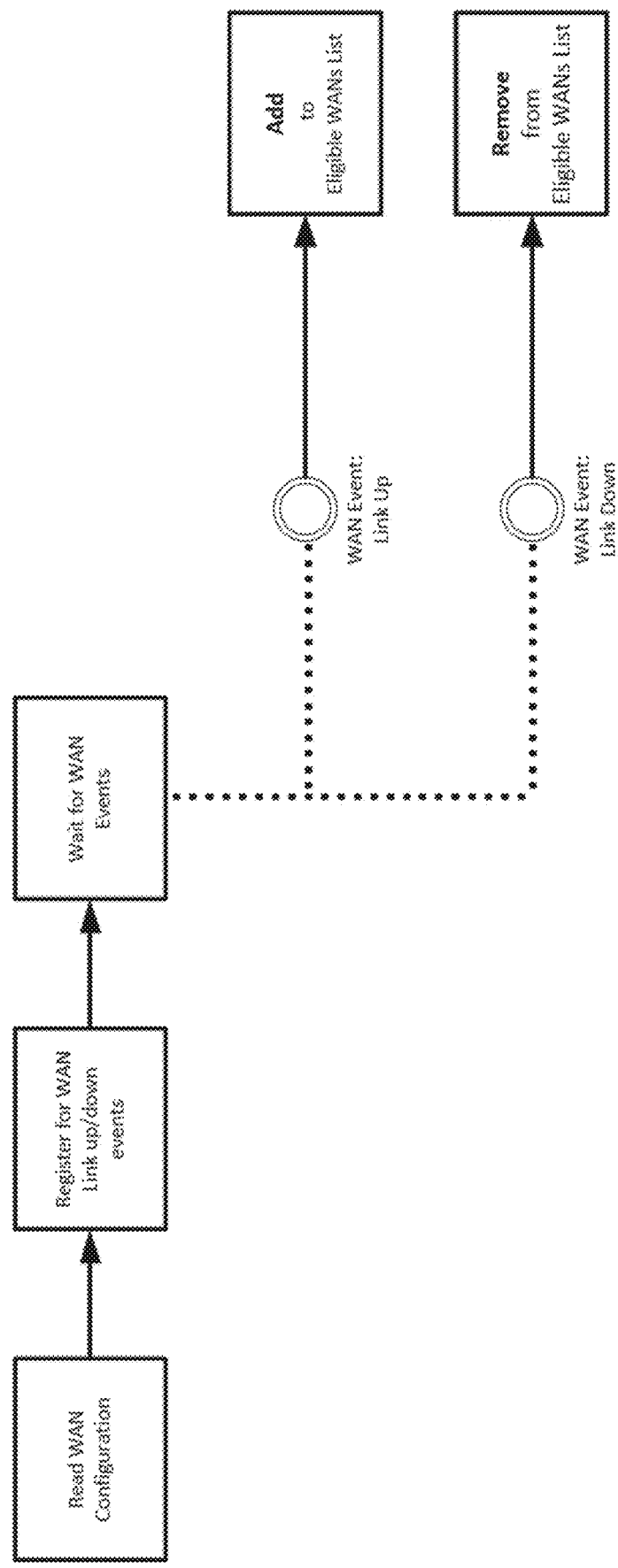
FIG. 9 depicts a flow diagram of the steps of an embodiment of the implementation of one or more of the methods disclosed herein.

FIG. 9 depicts a flow diagram of the steps of an embodiment of the implementation of one or more of the methods disclosed herein. In the depicted embodiment there is a WAN link availability event management function which adds and removes eligible WAN's to an availability list so that the available WANs can be used in the methods described. The software function registers for WAN link up and down events and then waits for WAN events. If there is a WAN event indicating that a WAN link is up and available for use, then the management function adds the respective WAN to the WANs available list. If there is a WAN event indicating that a WAN link is down and thus not available, then the management function removes the respective WAN from the WANs available list.

The mechanism for communication of data packets is the User Datagram Protocol for managing and sending of data packets over multiple available data packet transmission channels.

Data packets can be any size from 1 byte to 1385 bytes. If the data packet length exceeds 1385 bytes, the IP layer partition's them into multiple packets and then sends them to be reassembled. There is no special process for data fragmenting and reassembly in accordance with the operation of the IP layer. OpenVPN creates a tunnel interface with whatever Maximum Transmission Unit (MTU) (the largest sized packet in bytes) is configured. In an embodiment the MTU is set to 1385 because the LTE link can support only that many bytes. If the application packet, as received, is larger than 1385 bytes the IP layer fragments the packets into, in an embodiment, a 1385 byte packet and the remainder (assuming the reminder is less than 1385 bytes) and transmits both packets as IP segments, and at the receiving end the IP layer reassembles the fragmented packets into a single packet and sends that packet to the receiving application.

In an embodiment the method comprises the following steps:

Allocating a unique identity to each data packet including an order indicator to form an ordered series of data packets. The unique identity can be a random digit generator output which creates a sequence of sequential digits in any format, decimal, HEX, etc. and as long as the format of the digit is known at the receiving end of any transmission then the order of the unique identity can be checked as each received packet is stored ready for being made available to the output device. The series continues forever as long as the transport interface is up. Starting of a sequence numbering can be a randomly generated number. But from there, it needs to increment monotonically so losses can be detected. Standard TCP protocol does this as well.

Figure 3:
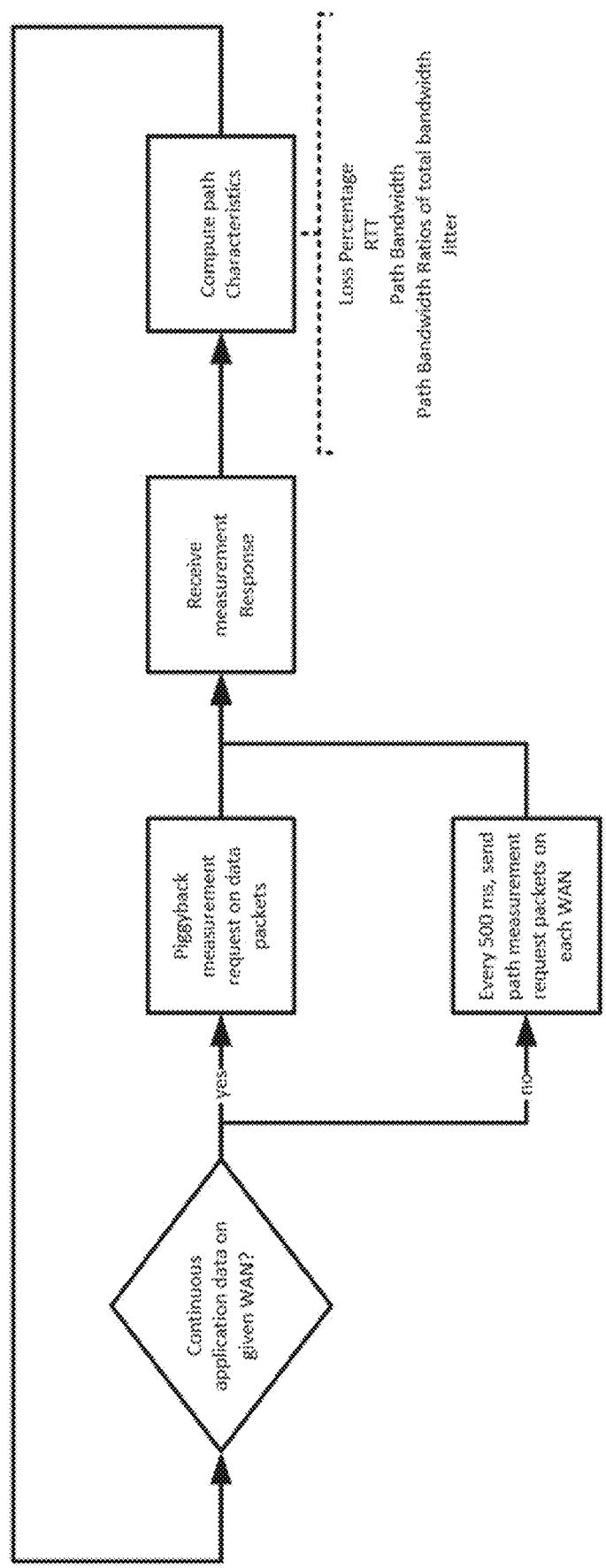
FIG. 3 depicts a flow diagram illustrating aggregation of data packets.

Transmitting one or more of the ordered series of data packets on a predetermined one of the available data packet transmission channels at a predetermined rate for transmission using User Datagram Protocol. The determination of how many data packets are to be transmitted on which of the available transmission channels is made in the first instance based on an assumption that each available path has the same characteristics, but future determinations will be as a consequence of the analysis of the information received by the sending application relating to selected characteristics of the transmission in the previous interval, where in an embodiment, the interval is 500 milliseconds (500 ms). The predetermined rate of transmission is determined by an assessment of one or more of the path characteristics refer to FIG. 3 for example, discloses, that if there is continuous application data on a given WAN, and there is use of a piggyback measurement request on data packets, if not, then every 20 ms a path measurement request packet is sent on each WAN. End of the measurement interval 500 ms results in a computation of link capacity (BW), and loss percentage (LP), and latency (LAT) or Round Trip Delay (RTT), and Jitter (JIT), can be measured, and the assessment is performed based on, at first instance in one embodiment, each path is not distributed with packets equally or the rate of transmission is not equal. In an embodiment the distribution of packets on all the available paths begins as each path being used at a small data packet bandwidth level—enough to send 1-2 packets. Since there are unlikely to be any packets lost to begin with, the number of packets sent on each path is gradually increased every INTVL period after calculating LP, LAT and BW, and the share of traffic sent, stops at a number that starts creating packet loss. Thus, the available paths and their capacity is used at the lower rates and there is, in one embodiment, a slow increase in the packet rate as long as there is no loss on a specific path and the packet rate is adjusted downwards as the predetermined characteristics indicate less than acceptable characteristics including in one embodiment, more than an acceptable packet loss.

Figure 11:
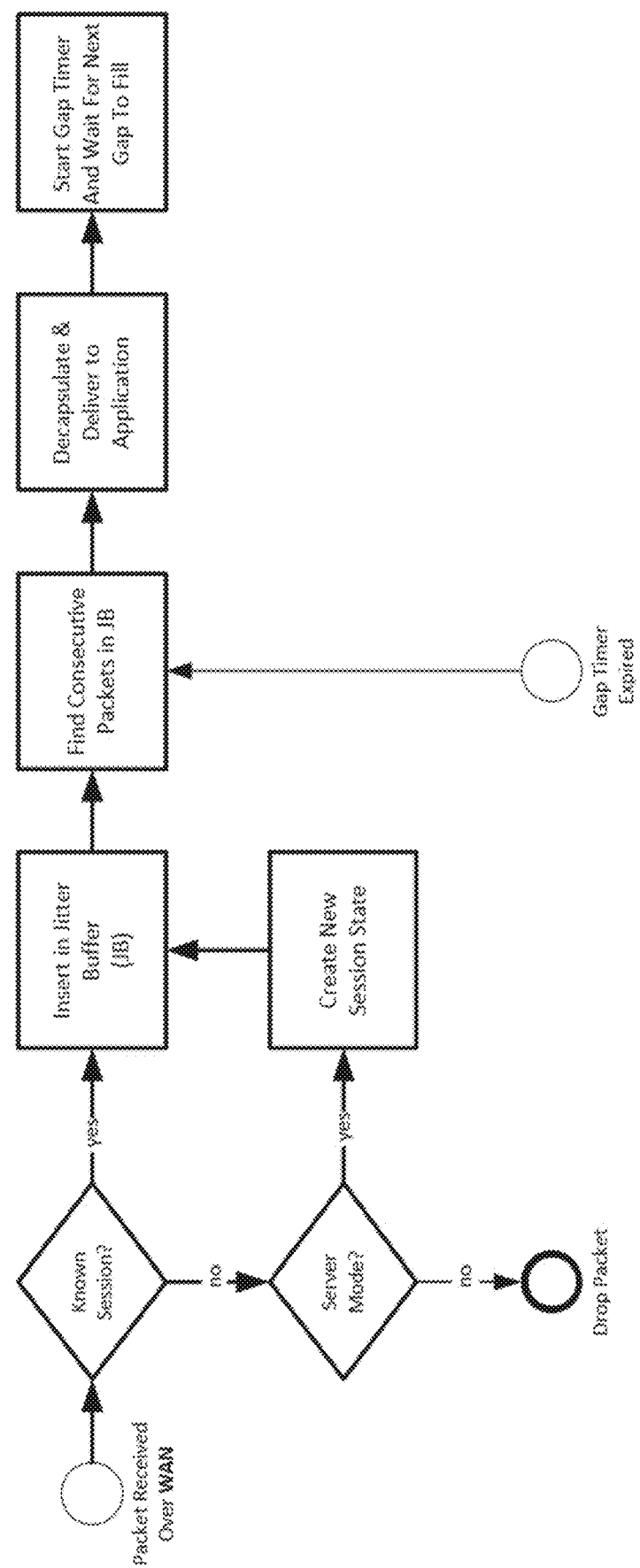
FIG. 11 depicts a flow diagram of the steps of another embodiment of the implementation of one or more of the methods disclosed herein using a Wide Area Network for sending packets.

Receiving after a predetermined measuring interval, data representative of one or more data packet transmission channel conditions associated with prior transmissions of one or more of the ordered series of data packets transmitted using User Datagram Protocol. One or more of the link capacity (BW) and loss percentage (LP) and latency (LAT) or Round Trip delay Time (RTT) and Jitter (JIT) are used as determinants of the data packet transmission channel conditions. In an embodiment there are more reliable transmission methods to communicate this control information. In another embodiment, the existing data packets piggy back on the data packets being sent back. That piggy backing has its own advantages as it provides more robustness. If a separate transmission method is used that transmission channel may not be reliable enough. In an embodiment TCP connections are used to exchange the above described transmission channel conditions instead of piggy backing on data packets. But then, in another embodiment, a new protocol is used to transmit the data packets in time to the other end. However, it is preferable and more robust to piggy back data on existing data packets. The information being communicated is not BW, LP, LAT (or RTT), and JIT. The sender sends packets with sequence numbers—one at each individual path level and one at aggregate level. The receiver calculates LP based on missing sequence numbers, transmits LP, individual path sequence number and aggregate sequence number received and timestamps of receptions. BW, LAT, JIT are calculated by the sender and kept ready for next INTVL usage as depicted in FIG. 11.

Figure 4:
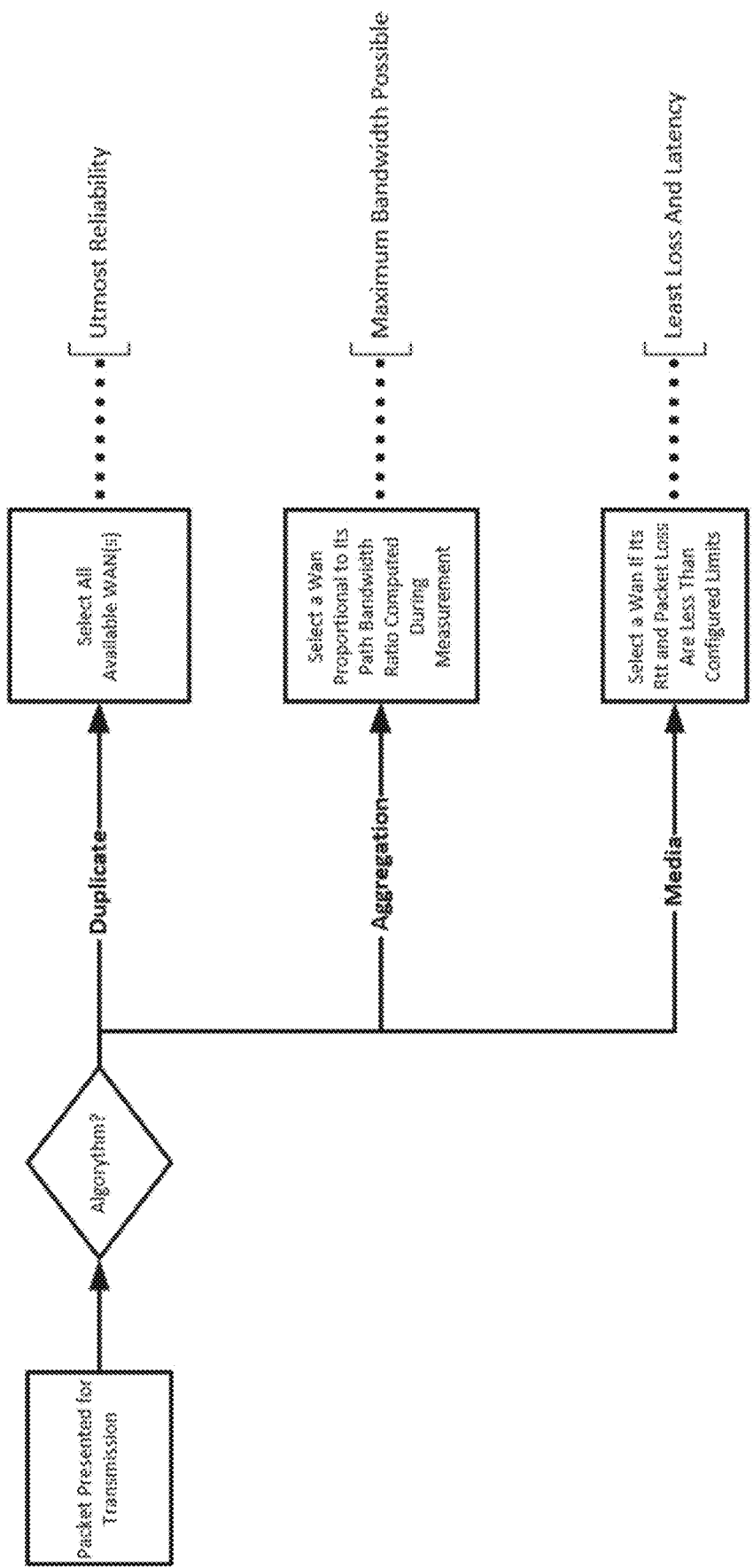
FIG. 4 depicts a flow diagram illustrating best path grouping of data packets.

In an embodiment the step of determining, using the one or more conditions, is one in which, the making available of further of the ordered series of data packets to a predetermined one of the available data packet transmission channels at a predetermined rate for transmission using User Datagram Protocol, is done according to one of a predetermined data packet distribution mode. Wherein the available data packet transmission channels receive none, one or more of the ordered series of data packets in accordance with the predetermined mode, being one of packet loss recovery or aggregation or duplication, of selected of the ordered series of data packets as depicted in FIG. 4, wherein duplication and selection of all available WANs provides utmost reliability; wherein aggregation and selection of a WAN proportional to its path data packet bandwidth ratio computed during a measurement after an predetermined interval provides maximum data packet bandwidth possible; and wherein for multimedia and selection of a WAN if RTT and packet loss are less than the predetermined determinants of the data packet transmission channel conditions then that selection will be made to provide least loss and least latency.

The use of one or more of the available channels is determined but it can be that one path/tunnel is not used. However, the way in which a badly performing channel is added back into the selection or availability process is dealt with, in accordance with an embodiment, the new path starting out with the transmission of minimal packets (e.g. 1-2). As long as there is no loss and latency is within predetermined limits, the number of packets sent, are gradually increased until packet loss occurs that exceeds the predetermined limits. If at some point path losses and latency go above those limits, no traffic is sent (if Best Path Grouping is used), or reduced traffic (in case of AGGR) is sent. In the case when no traffic is sent (i.e. the path is taken out of use), there are null packets (0 length packets) always being transmitted on the particular path. Those null packets are used to continuously measure path characteristics without effecting data traffic.

The predetermined modes include aggregation or best paths groupings or duplication or a combination of them as disclosed herein. Software can dynamically switch between best paths groupings and duplicate modes depending on the conditions of the paths. Aggregation mode doesn't make sense to switch to duplicate as reliability is not the outcome of these embodiments.

The mechanism for communication of data packets is the User Datagram Protocol for managing and sending of data packets, wherein each data packet has an order indicator, over multiple available data packet transmission channels. The order indicator is as described herein in an embodiment, but there can be other ordering sequences. One at the global level i.e. aggregated session level—each aggregated session has its own sequence numbering. Alternatively, but not the only alternative, at each path within an aggregate session. For both of these embodiments' sequence numbering starts, at a random number and monotonically increments. When the number reaches a maximum integer number, one option, is to wrap the numbering around and continue again with monotonic increases. Aggregate session level sequence numbering is used to reassemble packets received via different paths into their correct order at the receiving end. Path level sequence numbering is used to detect losses. Both of the described sequence numbers are included as a header on each packet sent on each path so the receiving end can use that number for the above-described purposes.

Figure 10:
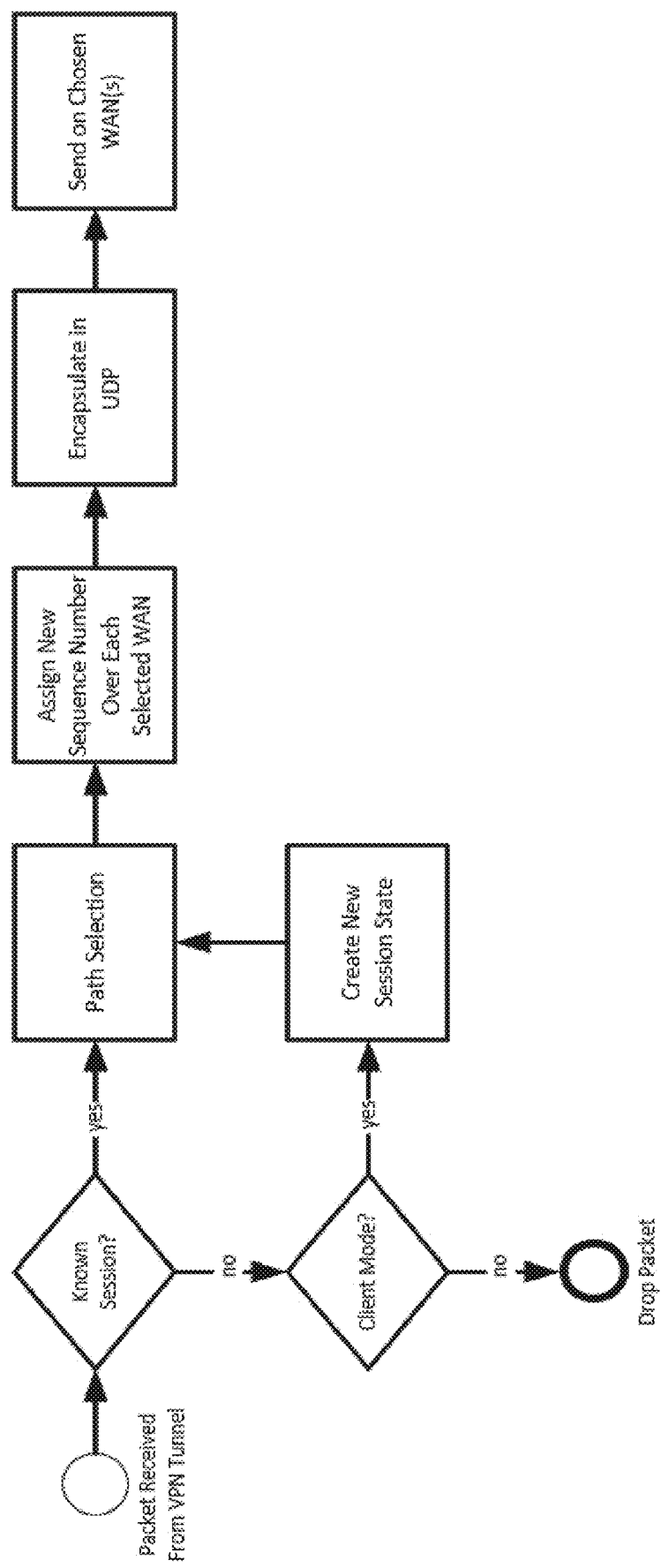
FIG. 10 depicts a flow diagram of the steps of another embodiment of the implementation of one or more of the methods disclosed herein using Virtual Private Network Software.

Receiving data packets from one or more of the available VPN data packet transmission channels is disclosed in FIG. 10.

Sorting the data received data packets, using the order indictor, is done in an embodiment, when the receiver maintains one reorder buffer per known aggregate session.

In the client mode, when packets are received from client application such as a Tunneling Software, MPUDP software checks if those packets belong to an existing session. If not, a new session is created. MPUDP software then makes path selection based on current WAN characteristics measured in the last measurement interval (INTVL), assigns unique identifier for the packet on the chosen WAN and transmits out on that WAN as shown in FIG. 10.

On the receiving end (server mode), as and when packets are received from various WAN paths, MPUDP software queues them into reordering buffer. It transmits out received packets to the application as and when they are received as long as there are no missing packets as depicted in FIG. 11. If there is a missing packet detected (otherwise known as a hole), the buffer holds those packets after the hole for a configurable hold time—say 10-100 milliseconds (a gap timer)—to see if the hole gets filled. As soon as hole is filled (that is the delayed packet is received), the buffer transmits the group of packets pending in the receive buffer (jitter buffer) up to the next hole that is detected (by locating the consecutive packet in the jitter buffer), if any, to the receiving application. If the hole is not filled within that hold time (gap timer expired), the missing packets are presumed lost, and hence the preferred method transmits the received ordered packets anyway (including the existence of the hole) to the application, as depicted in FIG. 11.

Determining from one or more of the received data packets, one or more data packet transmission channel conditions. It is possible to receive as many or as few as possible data packets containing one or more of the data packet channel conditions along one or more of the available paths/channels/tunnels.

Transmitting over an available data packet transmission channel, after a predetermined measuring interval, a datagram containing data representative of one or more data packet transmission channels and data representative of the rate of datagram transmission associated with selected of the ordered series of data packets. The measuring interval can be set or it can be in an embodiment, dynamic, and as disclosed elsewhere, the conditions applicable for this to be set at a certain period or to change will depend on a number of factors, such as the use of the MPUDP implementation to transmit on specific paths by commanding the underlying Linux UDP layer to send the packets out on specific paths. In the preferred embodiment the MPUDP implementation uses Linux sockets interface mechanism to command Linux to send UDP packets out of a specific path. This standard Linux sockets interface lets applications set SOURCE ROUTE option for the socket at the initialization time and then, for each packet, specify one of the interfaces by its ID out of which packet should be sent out.

For the receiver in this arrangement the available data packet transmission channels make available none, one or more of the ordered series of data packets in accordance with a predetermined mode, being one of packet loss recovery or aggregation or duplication, of selected of the ordered series of data packets. The way in which to use one of the modes or even switch between modes dynamically, without user intervention, is based on certain application demands. In an embodiment, switching between modes is dynamically done between Best Path Grouping mode and Duplicate mode.

When none of the paths are meeting LP and/or LAT requirements set by user, in an embodiment the implementation switches to Duplication mode, hoping that the other end will receive packets in-time over at least one of the paths. When conditions improve (i.e. LP and LAT on at least one path falls below configured thresholds), then in the described embodiment, the implementation switches back to the Best Path Grouping mode. Aggregation mode does not provide any dynamic switching. Aggregation mode accounts for deteriorating paths by reducing the percentage of total traffic sent on such paths.

Making available the received data packets as an ordered series of data packets. For the receiving device this ordered series of data packets is applied, to a suitable application, to allow the user of the device to listen or watch the multimedia data contained in the data packets. This process is separate from the methods disclosed in this specification. As described previously the MPUDP receiver reorders packets received on various paths and delivers to the application (OpenVPN in this embodiment) those received packets in the correct sequence of transmission. In-order delivery is very important to TCP based applications. Loss or out-of-order delivery of packets effects TCP throughput very badly. Similarly, Video and Audio interactive applications (conferencing) can also easily perceive certain loss or out-of-order delivery above some threshold easily.

The invention is not limited to the embodiment hereinbefore described which may be varied in construction and detail without departing from the spirit of the invention. The entire teachings of any patents, patent applications or other publications referred to herein are incorporated by reference herein as if fully set forth herein.

The invention claimed is:

1. A method for using User Datagram Protocol to manage sending of data packets over multiple available data packet transmission channels, the method includes the following steps:
   a) allocating a unique identity to each data packet including an order indicator to form an ordered series of data packets;
   b) transmitting one or more of the ordered series of data packets on a predetermined one of the available data packet transmission channels at a predetermined rate for transmission using User Datagram Protocol;
   c) receiving, after a predetermined measuring interval, data representative of one or more data packet transmission channel conditions associated with prior transmissions of one or more of the ordered series of data packets transmitted using User Datagram Protocol; and
   d) determining, using the one or more conditions, to make available further of the ordered series of data packets to a predetermined one of the available data packet transmission channels at a predetermined rate for transmission using User Datagram Protocol according to one of a predetermined data packet distribution mode, wherein the available data packet transmission channels receive one or more of the ordered series of data packets in accordance with the predetermined mode, the predetermined mode being a best path group selection of which two or more channels for sending of data packets over multiple available data packet transmission channels, wherein the best path group selection mode includes the steps of:
   selecting channels with less than a predetermined Lost Packet ratio to form a selected first group of channels;

determining a channel with the least latency value among the selected first group of channels;

determining, from within the selected first group of channels, a second group of channels which have a latency value within a predetermined value of the latency value of the path determined to have the least latency value; and transmitting data packets on the second group of channels in the ratio of a data packet bandwidth of each channel in the second group of channels.

2. A method according to claim 1 wherein the predetermined Lost Packet ratio is between 0.01% and 4%.

3. A method according to claim 2 wherein the predetermined Lost Packet ratio is 2%.

4. A method according to claim 1 wherein the predetermined latency value is between 10 milliseconds and 200 milliseconds.

5. A method according to claim 4 wherein the predetermined latency value is 100 milliseconds.

6. A method for using User Datagram Protocol to manage reception of data packets, each data packet having an order indicator, over multiple available data packet transmission channels, the method includes the following steps:
   a. receiving data packets using User Datagram Protocol from one or more of the available data packet transmission channels;
   b. sorting the data packets received using the order indicator;
   c. determining from one or more of the received data packets, one or more data packet transmission channel conditions;
   d. transmitting over an available data packet transmission channel, after a predetermined measuring interval, a datagram containing data representative of one or more data packet transmission channel and data representative of a rate of datagram transmission associated with selected of an ordered series of data packets wherein the available data packet transmission channels make available none, one or more of the ordered series of data packets in accordance with a predetermined mode, the predetermined mode being a best path group selection of which two or more channels for sending of data packets over multiple available data packet transmission channels, wherein the best path group selection mode includes the steps of:
   selecting channels with less than a predetermined Lost Packet ratio to form a selected first group of channels;
   determining a channel with the least latency value among the selected first group of channels;
   determining, from within the selected first group of channels, a second group of channels which have a latency value within a predetermined value of the latency value of the path determined to have the least latency value; and
   transmitting data packets on the second group of channels in the ratio of a data packet bandwidth of each channel in the second group of channels; and
   e. making available the received data packets as an ordered series of data packets.

7. A non-transitory computer program product for using User Datagram Protocol to manage sending of data packets over multiple available data packet transmission channels, the computer program product comprising a non-transitory computer-readable storage medium containing computer program code that when executed causes one or more processors to perform the steps of:

a) allocating a unique identity to each data packet including an order indicator to form an ordered series of data packets;

b) transmitting one or more of the ordered series of data packets on a predetermined one of the available data packet transmission channels at a predetermined rate for transmission using User Datagram Protocol;

c) receiving after a predetermined measuring interval, data representative of one or more data packet transmission channel conditions associated with prior transmissions of one or more of the ordered series of data packets transmitted using User Datagram Protocol; and d) determining, using the one or more conditions, to make available further of the ordered series of data packets to a predetermined one of the available data packet transmission channels at a predetermined rate for transmission using User Datagram Protocol according to one of a predetermined data packet distribution mode, wherein the available data packet transmission channels receive one or more of the ordered series of data packets in accordance with the predetermined mode, the predetermined mode being a best path group selection of which two or more channels for sending of data packets over multiple available data packet transmission channels, wherein the best path group selection mode includes the steps of:
   selecting channels with less than a predetermined Lost Packet ratio to form a selected first group of channels;
   determining a channel with the least latency value among the selected first group of channels;
   determining, from within the selected first group of channels, a second group of channels which have a latency value within a predetermined value of the latency value of the path determined to have the least latency value; and
   transmitting data packets on the second group of channels in the ratio of a data packet bandwidth of each channel in the second group of channels.

8. A method according to claim 7 wherein the predetermined Lost Packet ratio is between 0.01% and 4%.

9. A method according to claim 8 wherein the predetermined Lost Packet ratio is 2%.

10. A method according to claim 7 wherein the predetermined latency value is between 10 milliseconds and 200 milliseconds.

11. A method according to claim 10 wherein the predetermined latency value is 100 milliseconds.

12. A non-transitory computer program product for using User Datagram Protocol to manage reception of data packets, each data packet having an order indicator, over multiple available data packet transmission channels, the method includes the following steps, the computer program product comprising a non-transitory computer-readable storage medium containing computer program code that when executed causes one or more processors to perform the steps of:
   a. receiving data packets using User Datagram Protocol from one or more of the available data packet transmission channels;
   b. sorting the data packets received using the order indicator;
   c. determining from one or more of the received data packets, one or more data packet transmission channel conditions;
   d. transmitting over an available data packet transmission channel, after a predetermined measuring interval, a datagram containing data representative of one or more data packet transmission channel and data representative of a rate of datagram transmission associated with selected of an ordered series of data packets wherein the available data packet transmission channels make available none, one or more of the ordered series of data packets in accordance with a predetermined mode, the predetermined mode being a best path group selection of which two or more channels for sending of data packets over multiple available data packet transmission channels, wherein the best path group selection mode includes the steps of:

selecting channels with less than a predetermined Lost Packet ratio to form a selected first group of channels;

determining a channel with the least latency value among the selected first group of channels;

determining, from within the selected first group of channels, a second group of channels which have a latency value within a predetermined value of the latency value of the path determined to have the least latency value; and transmitting data packets on the second group of channels in the ratio of a data packet bandwidth of each channel in the second group of channels; and e. making available the received data packets as an ordered series of data packets.

\* \* \* \* \*